(12) United States Patent
Liu (10) Patent No.: US 7,095,541 B2
(45) Date of Patent: Aug. 22, 2006

(54) METHOD OF GENERATING AREA LIGHT SOURCE BY SCANNING, SCANNING AREA LIGHT SOURCE AND LASER PROJECTION TELEVISION USING THE SAME

(75) Inventor: Weiqi Liu, Jilin (CN)

(73) Assignee: Changchun Institute of Optics, Fine Mechanics and Physics, Chinese Academy of Science, Jilin (CN)

( * ) Notice: Subject to any disclaimer, the term of this patent is extended or adjusted under 35 U.S.C. 154(b) by 148 days.

(21) Appl. No.: 10/727,111

(22) Filed: Dec. 3, 2003

(65) Prior Publication Data
US 2005/0024699 A1 Feb. 3, 2005

(30) Foreign Application Priority Data
Dec. 3, 2002 (CN) .................. 02 1 44692
Dec. 12, 2002 (CN) .................. 02 1 44921
Dec. 12, 2002 (CN) .................. 02 1 44922

(51) Int. Cl.
*G02B 26/08* (2006.01)

(52) U.S. Cl. ............................................. 359/216

(58) Field of Classification Search .................. None
See application file for complete search history.

(56) References Cited

U.S. PATENT DOCUMENTS 5,865,521 A * 2/1999 Hashizume et al. .......... 353/38
6,137,461 A * 10/2000 Deter et al. .................. 359/216

* cited by examiner

*Primary Examiner*—Euncha P. Cherry
(74) *Attorney, Agent, or Firm*—Westman, Champlin & Kelly, P.A.

(57) ABSTRACT

A method of generating an area light source by scanning, an area light source and a laser projection television using the same. The method comprising the steps of illuminating a light beam onto a rotating polygon mirror rotating at a high speed on which each plane mirror has a predetermining slope angle with respect to it own rotating axis, and generating a 2-D scanning area. The invention provides a scanning area light source having uniform brightness, non-interference and high efficiency by uniform illumination of the spatial light modulator in a video display. Its scanning characteristics are that each of scanning points can cover many pixels, and that the adjacent scanning lines overlap a relatively large part to ensure uniform luminance of the scanning plane.

12 Claims, 8 Drawing Sheets

METHOD OF GENERATING AREA LIGHT SOURCE BY SCANNING, SCANNING AREA LIGHT SOURCE AND LASER PROJECTION TELEVISION USING THE SAME

The present application claims priorities of Chinese Patent Applications No. 02144921.X, No. 02144692.X and No. 02144922.8 filed on Dec. 12, 2002, Dec. 3, 2002 and on Dec. 12, 2002 respectively, which are hereby incorporated by reference.

BACKGROUND OF THE INVENTION

1. Field of the Invention

The present invention relates to a method of generating an area light source by scanning, an area light source and a laser projection television using the same. More particularly, the invention relates a scanning area light source having uniform brightness, non-interference and high efficiency, and a laser projection television using such a scanning area light source.

2. Description of the Related Art

From 90' in the last century, the television display technique is promoted with uninterrupted growth of high and new techniques. Various kinds of television color displays have been developed in the world, such as liquid crystal displays (LCD) technique, rear projection display technique, plasma display technique, laser color display technique, overlapping LED display technique and the like. These display techniques as mentioned above have some advantages but disadvantages, and two techniques being the most related art to the present invention now are available.

Figure 9:
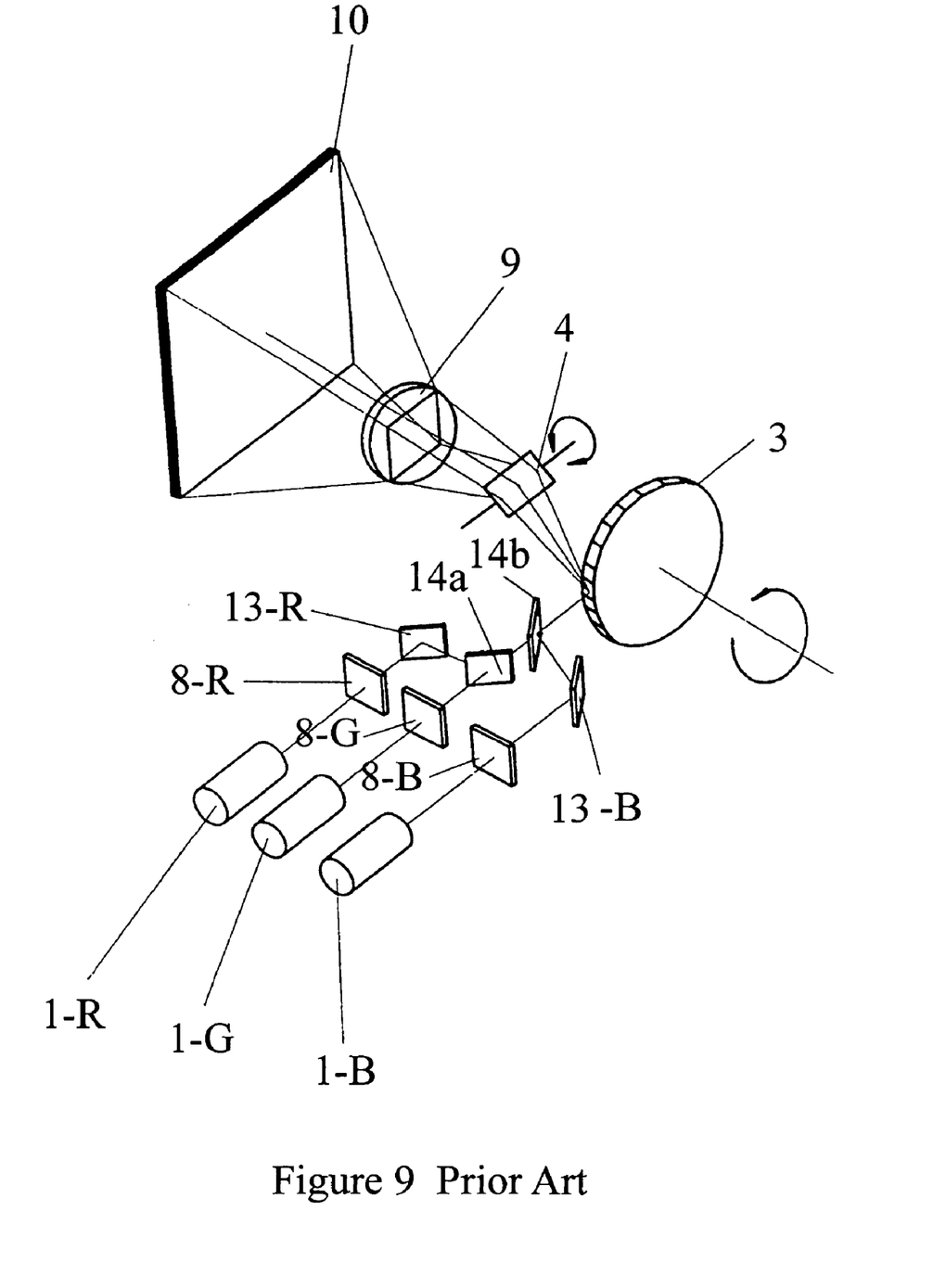
FIG. 9 is a diagram showing structures of a conventional laser television.

The first kind of displays is used in the laser television researched and developed by Laser Display Technique (LDT), Daimler Benz and Schneider Rundfunkwerke S. A. in Germany in joint venture (reported in Laser Focus World, November 1997, P52). As shown in FIG. 9, the Laser television above described comprises a red light laser 1-R, a green light laser 1-G, a blue light laser 1-B, a red light modulator 8-R, a green light modulator 8-G, a blue light modulator 8-B, mirrors 13-R and 13-B, a dichroic sheet for reflecting red light and transmitting green light 14a, a dichroic sheet for reflecting blue and transmitting green light 14b, a horizontal rotating mirror 3, a Galvanometric mirror 5, a projection objective 9 and a projection screen 10. The laser television technique above described should face some problems. It is very difficult to adjust dynamic equilibrium and to perform signal synchronization due to extreme rotating rate of the horizontal rotating mirror 3. And the latter has to keep excellent performance in preventing dust, otherwise the surfaces of the mirror should be damaged by dust. Several light intensity modulators require extreme high responding speed and very wide region in gray level modulation. In addition, such a laser television is high in cost and has problems to be resolved so that it is difficult to be produced in batch.

Figure 10:
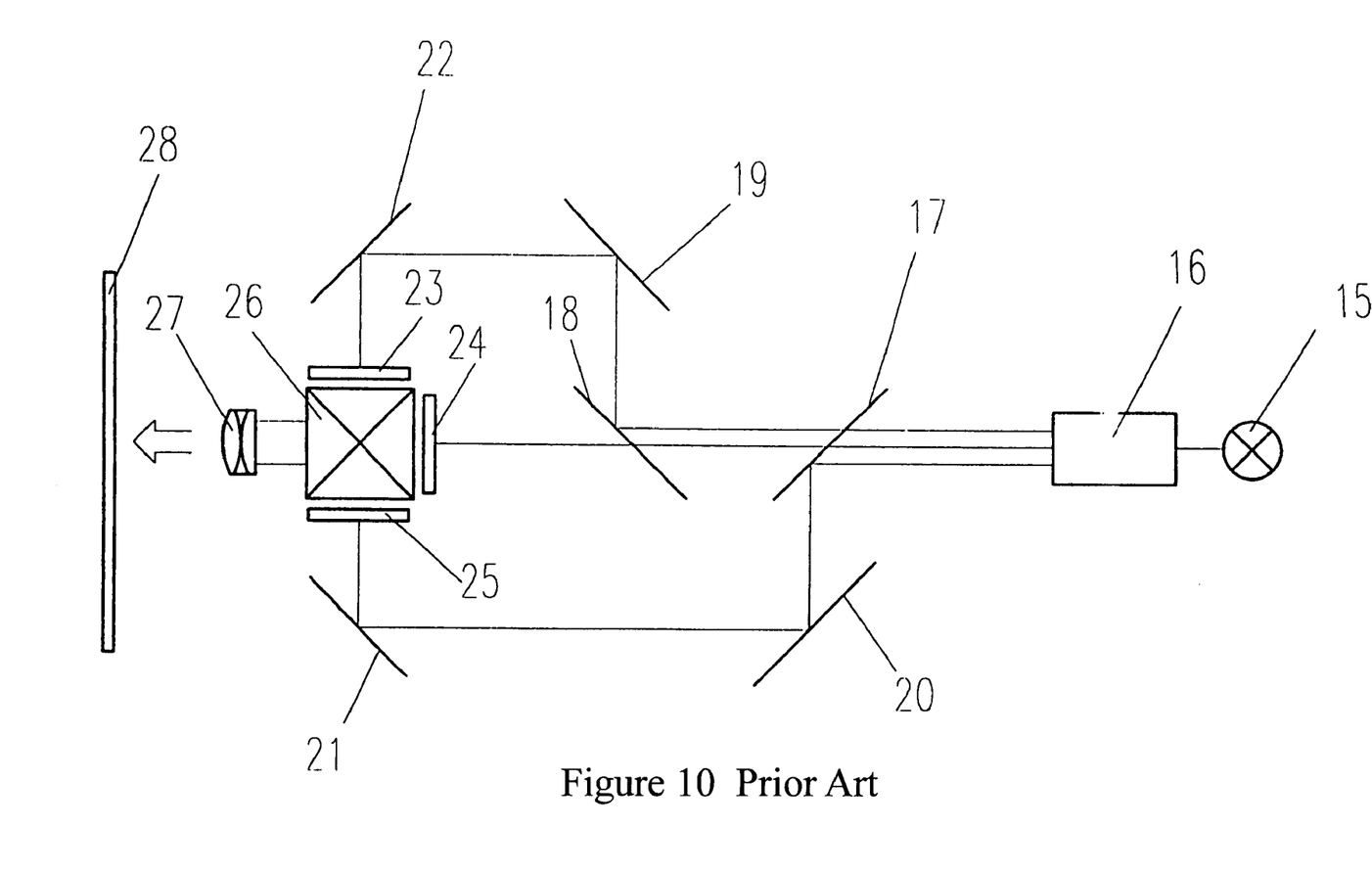
FIG. 10 is a diagram showing structures of a conventional projection television.

The second is produced by Hitachi Co. in Japan, as shown in FIG. 10, a projection unit comprises an incandescent lamp 15 as source, a beam expander 16, a dichroic sheet for reflecting red light and transmitting green and blue light 17, a dichroic sheet for reflecting blue light and transmitting green light 18, mirrors 19, 20, 21 and 22, a blue channel 2-D spatial light modulator 23, a green channel 2-D spatial light modulator 24, a red channel 2-D spatial light modulator 25, a combination prism 26, a projection objective 27 and a projection screen 28. However, the second television display technique also has some problems to be resolved: short operating lifetime of the incandescent lamp which generally operates for 2000 hours, high energy loss, narrow color gamut, low color saturation and complex structures caused by the dichroic reflection system.

As the developing of technique and the presence of solid state laser, a new laser color projection television which possesses advantages of two techniques above described is developed to provide high display quality.

Generally, a laser expander is a normal apparatus used to the field of laser application, which is to provide an area light source having a predetermined caliber by expanding a fine laser beam. It usually adopts a collimator tube, namely, a telescope system.

The laser expander using a collimator tube comprises a condenser lens, an aperture and a collimating lens. The laser expander is designed so that a rear focus of the condenser lens is located at the location of a fore focus of the collimating lens, and the aperture is arranged at this location to improve the collimating performance of the projected light. The laser expander is operated as the following: a laser beam generated from a laser device pass through the condenser lens to focus on the rear focus of the condenser, which is the fore focus of the collimating lens. Then the laser beam pass through the aperture located at the focus to irradiate the collimating lens, and further pass through the collimating lens to generate expanded parallel lights. Such a structure can implement the beam expanding of a laser beam, and it is a normal structure used to expand a laser beam. Unfortunately, since the expanded beam is coherent light, in the case of requiring incoherent lights, this structure has limitation and a new expander is needed. For example, in a laser display using a 2-D spatial light modulator, an incoherent area laser source with uniform brightness is requested. Otherwise, some strong interference fringes caused by the laser interference effect would be overlapped on images displayed so as to deteriorate imaging effects. In addition, the cross section of the light beam expanded by this expander is circular, and the brightness of light follows Gaussian distribution instead of uniform distribution. Therefore, this kind of expanded light could not be used as an illumination light source of laser display.

In the existing art, most of light scanning techniques are used to imaging purpose, instead of generating an area light source having uniform brightness. A main characteristic of these techniques exists in that the scanning points are separated from each other, which indicates each of the pixels. For example, the light scanning technique in a laser printer or a laser photocomposer is used for imaging purpose.

SUMMARY OF THE INVENTION

Accordingly, an object of the invention is to provide a method of generating an area light source in order to resolve the coherence and non-uniform distribution problems of light beam in the conventional laser display technique.

Another object of the invention is to provide a scanning area light source having uniform brightness, non-interference and high efficiency so as to implement an uniform illumination of 2-D spatial light modulator.

Still another object of the invention is to provide a laser projection television using the scanning area light source.

According to one aspect of the invention, A method of generating an area light source having no interference by scanning, comprising the steps of:

a) horizontally scanning a light beam to generate a horizontal line;
b) vertically scanning the light beam line by line, under the control of a vertical scanning mechanism;
c) repeating above steps a) and b) to form a scanning area having no interference.

According to another aspect of the invention, A scanning area light source, comprising of a light emitter (1) and a rotating polygon mirror (2), wherein, said light emitter (1) is used for emitting a light beam and projecting it onto said rotating polygon (2);

said rotating polygon mirror (2) is used for horizontally scanning the light beam to generate a horizontal line, vertically scanning the light beam line by line, and repeating above 2-D scanning to form an uniform scanning area having no interference.

According to still another aspect of the invention, A light projection television using a scanning area light source, comprising an area light source unit, an image combination unit and an image unit, wherein the area light source unit is used for projecting three light beams of R, G and B onto a rotating polygon mirror (2) rotating at high speed, rotating polygon mirror (2) is used for horizontally scanning the light beam to generate a horizontal line, vertically scanning the light beam line by line, repeating above 2-D scanning so as to transforming three light beams into an uniform scanning area having no interference and refreshing with a predetermined field frequency, and illuminating three spatial light modulators of R, G and B;

the image combination unit is used for combining three monochromatic images into a color image, wherein three spatial light modulators illuminated by three monochromatic light beams of R, G and B form three channel monochromatic images, which are combined in a combination prism to generate a color image;

the imaging unit is used for projecting the color image from the combination prism on a screen via an objective lens by taking the color image as an object of the objective lens.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying the present invention will be described in further detail using various embodiments with reference to the accompanying drawings. In the following description of the present invention, detailed description of known functions and configurations incorporated herein will be omitted for clarity of presentation.

First Embodiment

Figure 1:
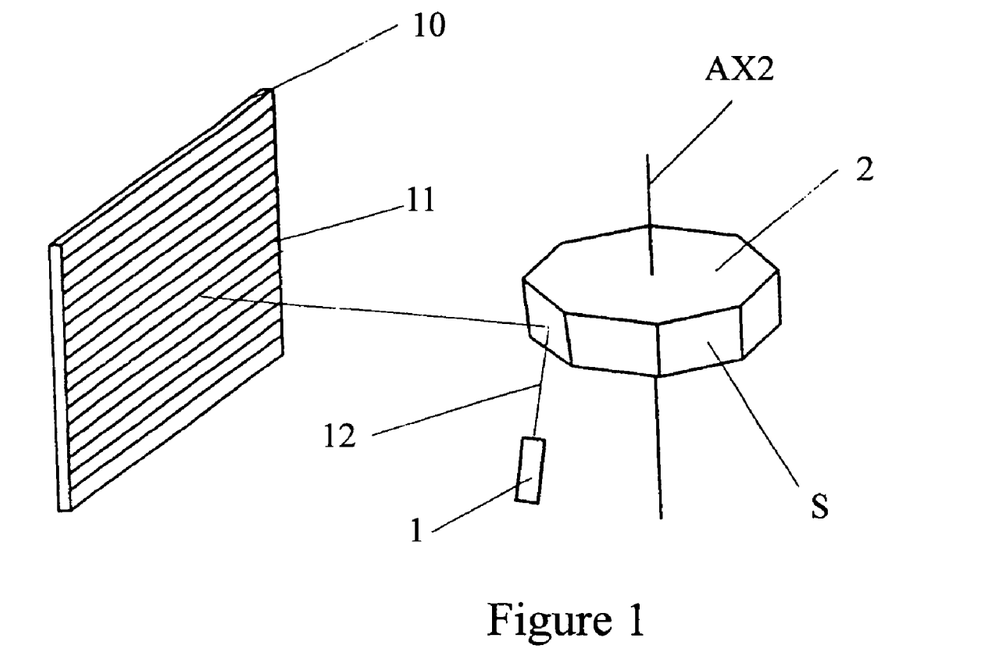
FIG. 1 is a schematic diagram showing a method of generating an area light source which implements 2-D scanning by using single mirror having multiple surface and variable slope angles, according to the first embodiment of the invention.

FIG. 1 is a diagram showing a method of generating an area light source which implements 2-D scanning by using single mirror having multiple surfaces and variable slope angles, according to the first embodiment of the invention.

As shown in FIG. 1, a scanning area light source used in laser video display comprises a laser 1, and a rotating polygon mirror 2. The laser 1 emits a laser beam 12 to illuminate the rotating polygon mirror 2 rotating at high speed. The reflection surface of each plane mirror S at the side of the rotating polygon mirror 2 has a slope angle with respect to the direction of self-rotating axis AX2. The beam reflected from each plane mirror scans a line 11, and when rotating over one plane next plane mirror S scans another line which is moved by one line to implement 2D scanning area. The rotating polygon mirror 2 rotating at high speed is a symmetric polygon about the center of axis AX2. Each plane mirror S reflects beams irradiated. The reflection surfaces of the adjacent plane mirrors S have slope angles with respect to axial direction each other. The rotating polygon mirror 2 has 40 plane mirrors S at the side of it and these plane mirrors S are symmetric about the center of the rotating polygon mirror 2. During scanning, in 1–$20^{th}$ plane mirrors S, the surface of each plane mirror S increase a same angle one by one with respect to the direction of the axis AX2. From the $21^{st}$ plane mirror S in 21–40 plane mirrors S, each plane mirror S decreases the same angle one by one. The plane mirrors are arranged in symmetric on the left and right. During 1–20 plane mirrors S of the rotating polygon mirror 2 scanning, each plane mirror S rotates over its surface, the scanning line 11 moves an angle, and the scanning line 11 moves downward by a line corresponding the angle. When rotating over the $20^{th}$ surface, the scanning line 11 moves downward by 20 lines in total. From the $21^{st}$ line, every time rotating over one plane mirror S, the scanning line 11 moves upward by one line until the $40^{th}$ line, namely, 20 lines moved upward in total. That is, the rotating polygon mirror 2 rotates each circle to complete scanning up and down reciprocately one time, and the rotating polygon mirror 2 rotates continuously one circle by one circle. Generally, the overlapping degree of two adjacent scanning lines 11 depends on the distance between the rotating polygon mirror 2 and a screen 10, and on the size of cross section of scanning beam, and also on the size of slope angle of the surface of each plane mirror.

Figure 2:
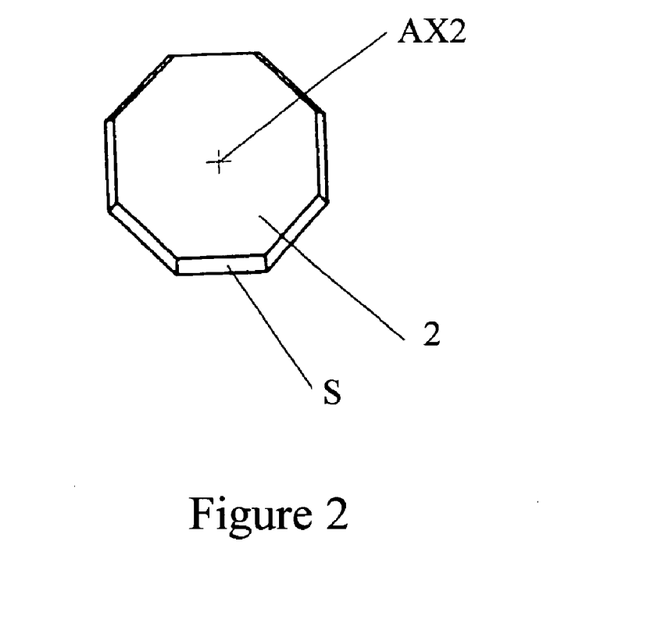
FIG. 2 is a diagram showing a top view of a rotating mirror of the invention.

As the above described, a scanning area light source of the invention comprises a laser 1, a rotating polygon mirror 2 and a screen 10. The rotating polygon mirror 2 is a symmetric polygon about the center of axis AX2. Each plane mirror S reflects beams irradiated. The reflection surfaces of two adjacent plane mirrors S have a slope angle with respect to axial direction each other. FIG. 2 shows an arrangement of the plane mirrors S at the side of the rotating polygon mirror 2, and a top view of the slope angle between adjacent plane mirrors S from an axial direction. As shown in FIG. 1, The laser 1 emits a laser beam 12 to illuminate the rotating polygon mirror 2, and the beam reflected from each plane mirror scans a line 11. Due to the reflection surface of each plane mirror S of the rotating polygon mirror 2 has a slope angle with respect to the direction of self-rotating axis AX2, when rotating over one plane next plane mirror S scans another line which is moved downward or upward by one line to implement 2D scanning area.

Since the reflection surfaces of the adjacent plane mirrors have a slope angle with respect to axial direction each other, the vertical rotating mirror is omitted. Thus, three channels scanning for red, green and blue is implemented by using single mirror, that is, the system structures are simplified.

The number of the plane mirrors S at the side of rotating polygon mirror 2 is even, for example 40. During scanning, in the 1–20$^{th}$ surfaces of the plane mirrors S, surface of each plane mirror S increases an angle with respect to the direction of the rotating axis AX2 one by one. For example, each surface of plane mirrors S increases an angle of 8'. From the 21$^{th}$ plane mirror S each surface of the 21–40$^{th}$ plane mirrors S decreases the same angle of 8' one by one. The plane mirrors S at the side of the rotating polygon mirror 2 are arranged in symmetric on the left and right. During the 1–20$^{th}$ plane mirrors S of the rotating polygon mirror 2 scanning, every time rotating over each surface of the plane mirrors S of the rotating polygon mirror 2, the scanning line 11 moves downward by an angle of 8', namely, moves downward by one line corresponding to the angle moved. When rotating over the 20$^{th}$ surface, the scanning line 11 moves downward by 20 lines in total. From the 21$^{st}$ line, every time rotating over one plane mirror S, the scanning line 11 moves upward by one line until the 40$^{th}$ line, namely, 20 lines moved upward in total. Thus, the rotating polygon mirror 3 rotates each circle to complete scanning up and down reciprocately one time. Furthermore, the overlapping degree of two adjacent scanning lines 11 depends on the distance between the rotating polygon mirror 3 and the scanning screen 6, and on the size of cross section of scanning beam, and also on the size of slope angle of the surface of each plane mirror.

Second Embodiment

Figure 3:
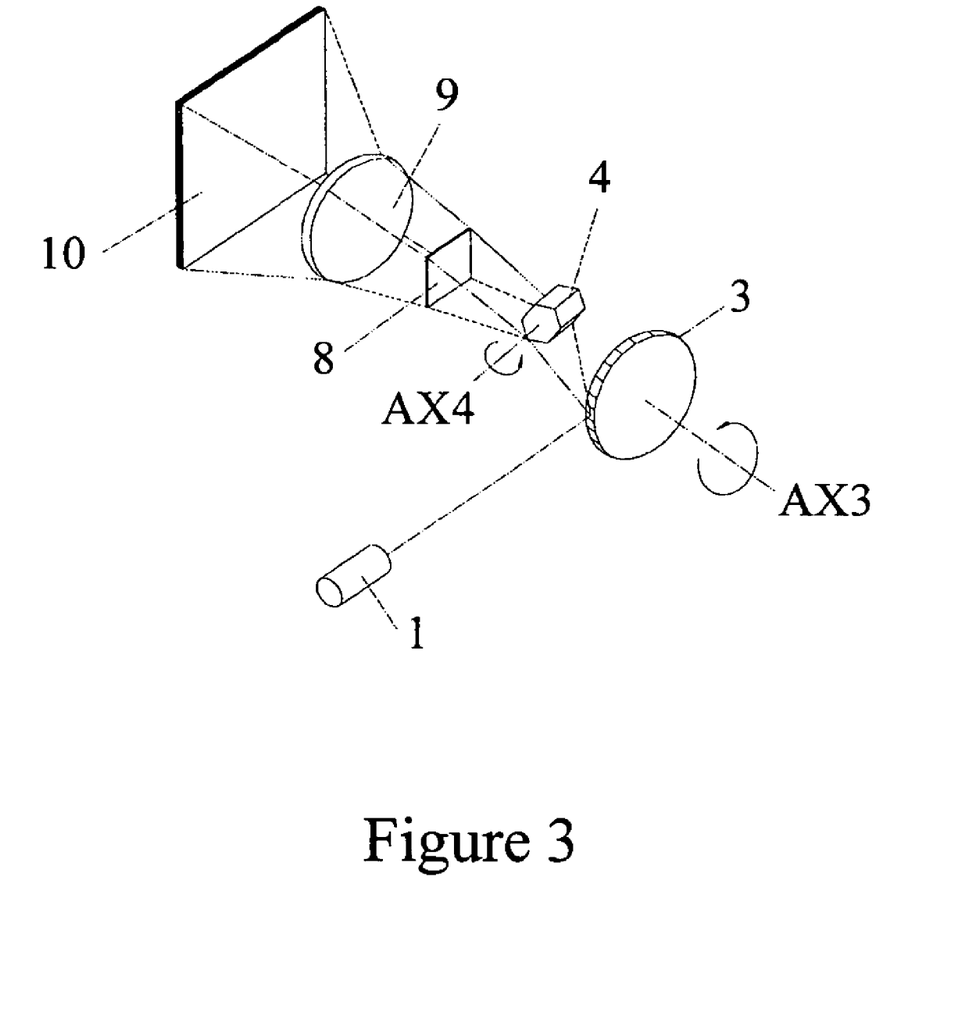
FIG. 3 is a schematic diagram showing a method of generating an area light source which implements 2-D scanning by using a horizontal rotating polygon mirror and a vertical rotating polygon mirror, according to the second embodiment of the invention.

FIG. 3 is a schematic diagram showing a method of generating an area light source which implements 2-D scanning by using a horizontal rotating polygon mirror and a vertical rotating polygon mirror, according to the second embodiment of the invention.

As shown in FIG. 3, a laser beam is emitted from a laser 1 and projected onto a horizontal rotating polygon mirror 3. The horizontal rotating polygon mirror 3 rotates around a rotating axis AX3 and scans the laser beam in such a way as to be made a line and projected onto a vertical rotating polygon mirror 4. The vertical rotating polygon mirror 4 rotates around a rotating axis AX4 and enables the laser beam form a 2D scanning area, which is projected onto a 2-D spatial light modulator 8. And then the image from the 2-D spatial light modulator 8 is projected onto a projection screen 10 via a lens 9. In this manner, a laser image is obtained through illuminating the 2-D spatial light modulator by using a scanning area light source.

Third Embodiment

Figure 4:
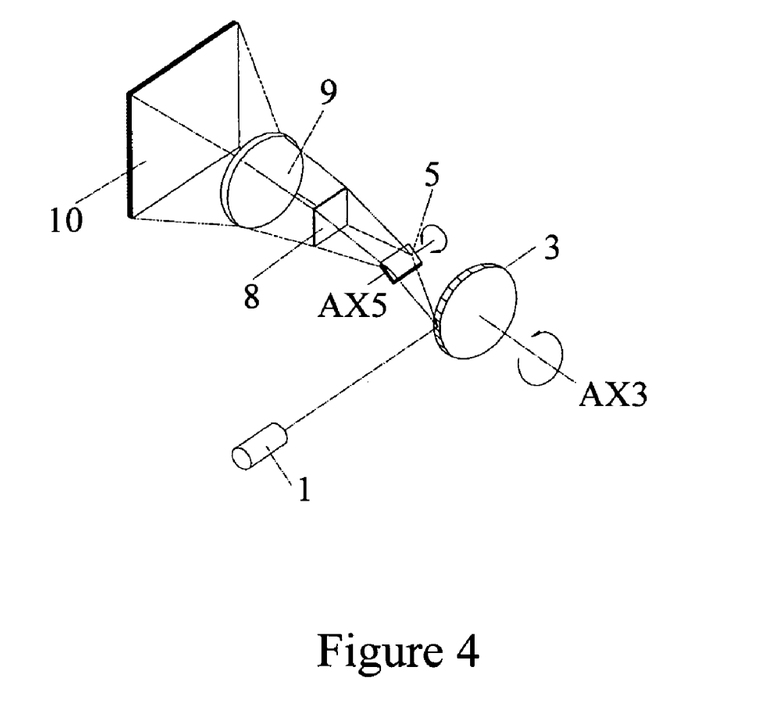
FIG. 4 is a schematic diagram showing a method of generating an area light source which implements 2-D scanning by using a horizontal rotating polygon mirror and a Galvanometric mirror, according to the third embodiment of the invention.

FIG. 4 is a schematic diagram showing a method of generating an area light source which implements 2-D scanning by using a horizontal rotating polygon mirror and a Galvanometric mirror, according to the third embodiment of the invention.

As shown in FIG. 4, a laser beam is emitted from a laser 1 and projected onto a horizontal rotating polygon mirror 3. The horizontal rotating polygon mirror 3 rotates around a rotating axis AX3 and scans the laser beam in such a way as to be made a line and projected onto the Galvanometric mirror 5. The Galvanometirc mirror 5 vibrates around a rotating axis AX5 up and down reciprocately, and enables the laser beam form a 2D scanning area, which is projected onto an 2-D spatial light modulator 8. And then the image from the 2-D spatial light modulator 8 is projected onto a projection screen 10 via a lens 9. In this manner, a laser image is obtained through illuminating the 2-D spatial light modulator by using a scanning area light source.

Forth Embodiment

Figure 5:
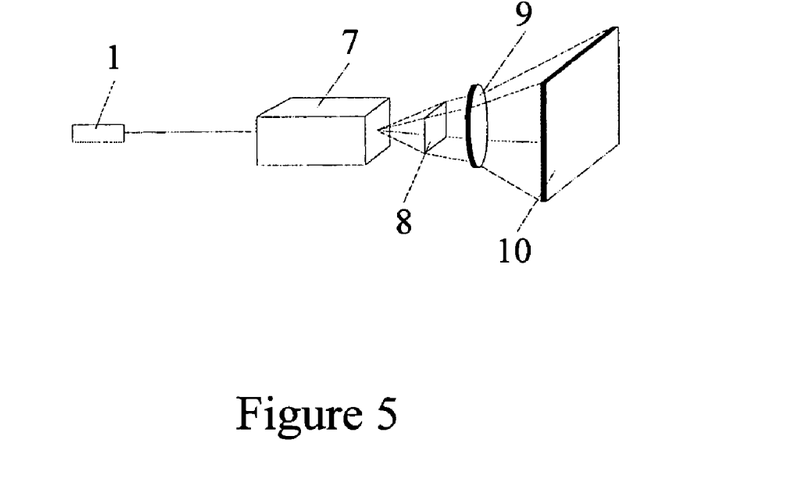
FIG. 5 is a schematic diagram showing a method of generating an area light source which implements 2-D scanning by using a piezoelectric tip/tilt platform mirror according to the forth embodiment of the invention.

FIG. 5 is a schematic diagram showing a method of generating an area light source which implements 2-D scanning by using a piezoelectric Tip/Tilt platform mirror according to the forth embodiment of the invention.

As shown in FIG. 5, a laser beam is emitted from a laser 1 and projected into a piezoelectric tip/tilt platform mirror 7. The piezoelectric tip/tilt platform mirror 7 drives piezoelectric crystal to generate angle changes based on a control signal, makes the laser beam scan in a 2D deflecting mode to illuminate the 2-D spatial light modulator 8. Then the image from the 2-D spatial light modulator 8 is projected onto a projection screen 10 via a lens 9. In this manner, a laser image is obtained through illuminating the 2-D spatial light modulator by using a scanning area light source.

Fifth Embodiment

Figure 6:
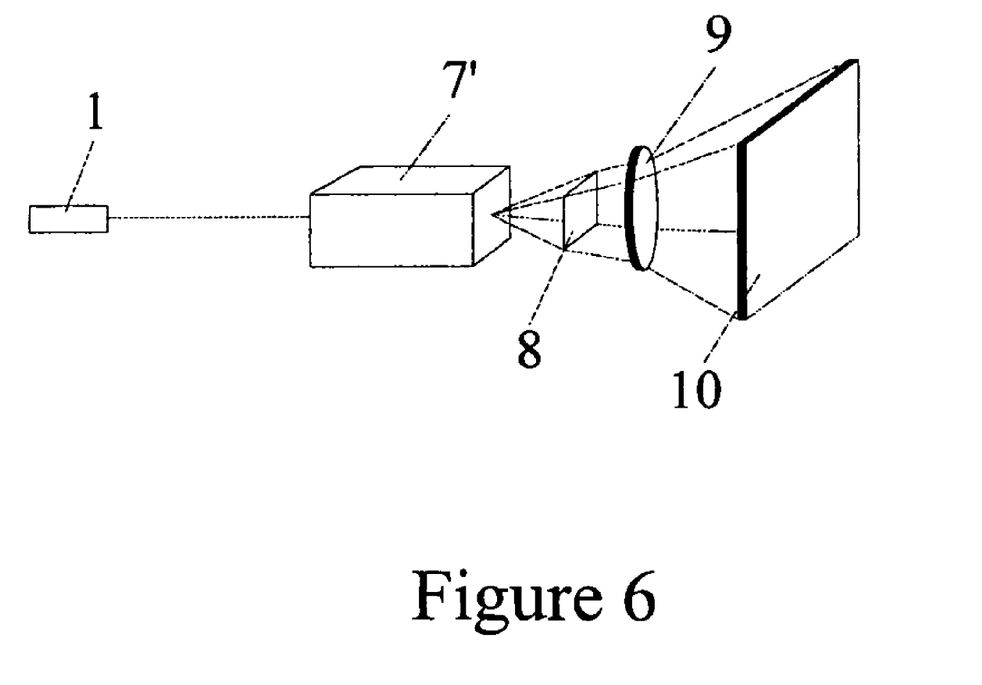
FIG. 6 is a schematic diagram showing a method of generating an area light source which implements 2-D scanning by using an acoustic light modulator according to the fifth embodiment of the invention.

FIG. 6 is a schematic diagram showing a method of generating an area light source which implements 2-D scanning by using an acoustic light modulator according to the fifth embodiment of the invention.

As shown in FIG. 6, a laser beam is emitted from a laser 1 and projected into the acoustic light modulator 7'. Under the driving of a control signal, the acoustic light modulator 7' makes the laser beam scan in a 2-D deflecting mode to illuminate a 2-D spatial light modulator 8. Then the image from the 2-D spatial light modulator 8 is projected onto a projection screen 10 via a lens 9. In this manner, a laser image is obtained through illuminating the 2-D spatial light modulator by using a scanning area light source.

Sixth Embodiment

Figure 7:
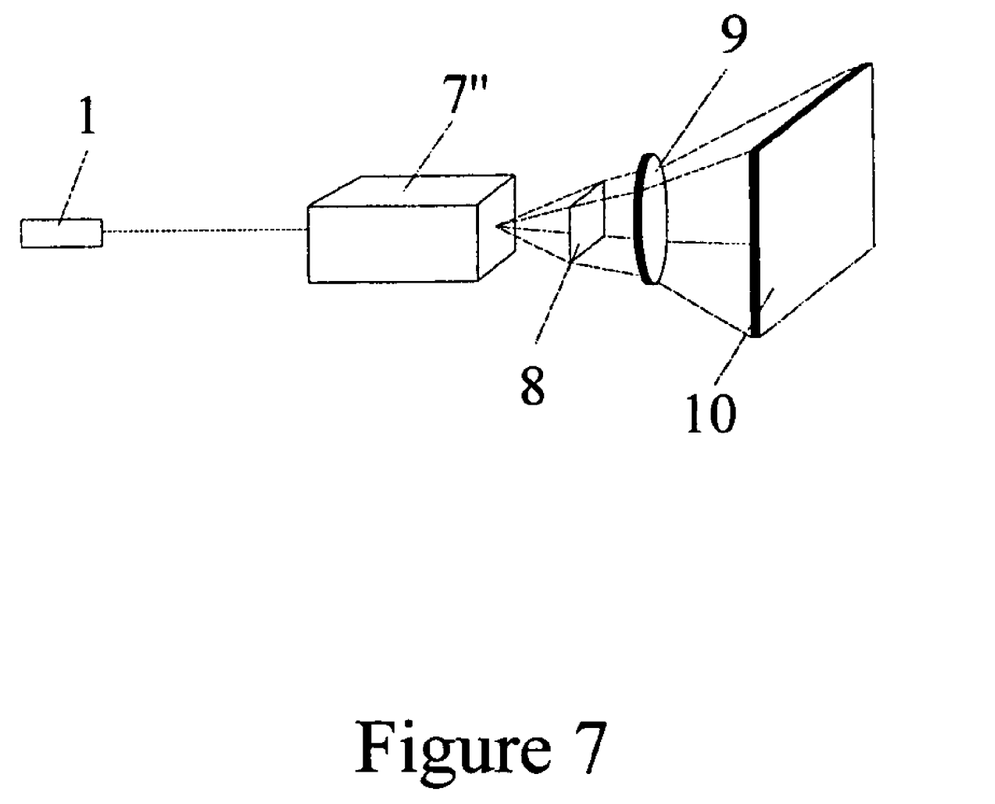
FIG. 7 is a schematic diagram showing a method of generating an area light source which implements 2-D scanning by using an electric light modulator according to the sixth embodiment of the invention.

FIG. 7 is a schematic diagram showing a method of generating an area light source which implements 2-D scanning by using an electric light modulator according to the sixth embodiment of the invention.

As shown in FIG. 6, a laser beam is emitted from a laser 1 and projected into the electric light modulator 7''. Under the driving of a control signal, the electric light modulator 7'' makes the laser beam scan in a 2-D deflecting mode to illuminate a 2-D spatial light modulator 8. Then the image from the 2-D spatial light modulator 8 is projected onto a projection screen 10 via a lens 9. In this manner, a laser image is obtained through illuminating the 2-D spatial light modulator by using a scanning area light source.

All the above-mentioned scanning modes are existing techniques except the first scanning mode, but, the method for laser displaying and removing noise of laser interference is presented by the present invention. The characteristics to be protected are as follows: generating area light sources by using a method of scanning, illuminating a 2-D spatial light modulator, and realizing laser display.

Figure 8:
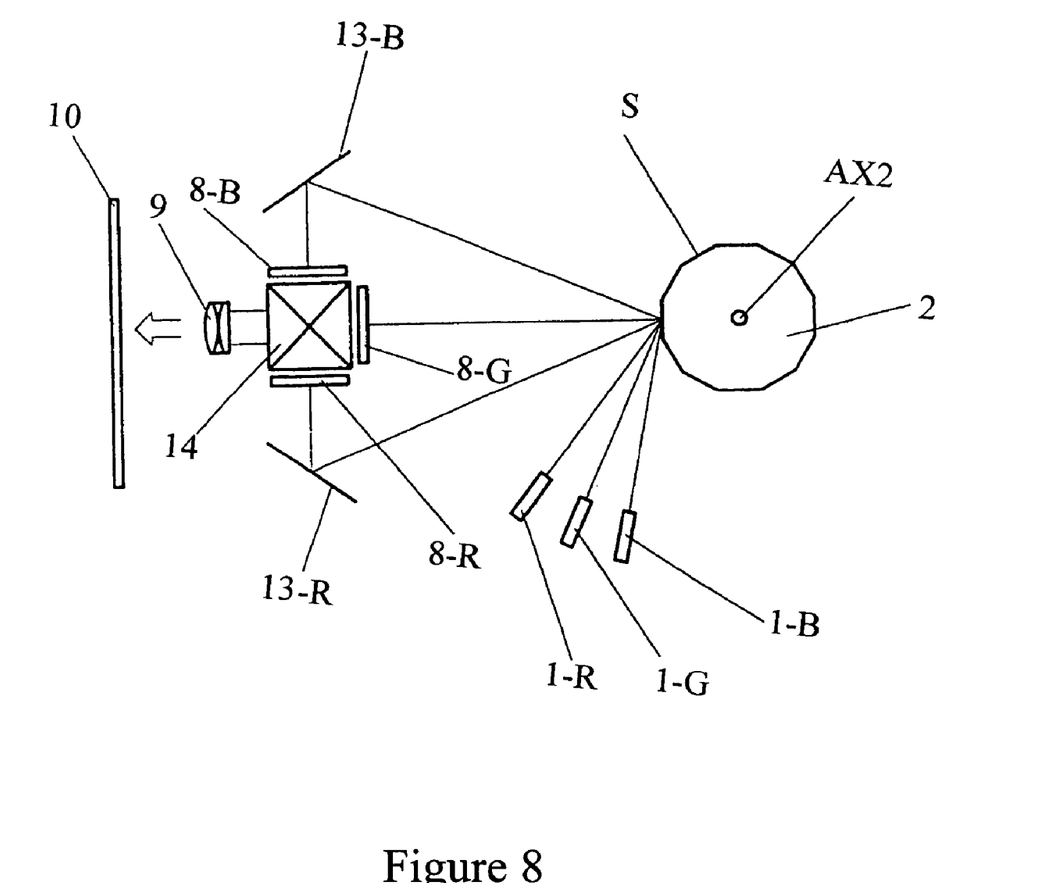
FIG. 8 is a diagram showing structures of a laser projection television using a scanning area light source of the invention.

FIG. 8 is a diagram showing structures of a laser projection television using a scanning area light source of the invention.

In laser video display, laser light source is one of necessary components and is also a crucial factor for video display definition and luminance. Ordinary laser beam-expanding devices can not be directly applied to laser video display of area array light valve due to non-uniform luminance and interference. In order to resolve the problems of coherence and non-uniform luminance of beam expanded in the existing techniques, the present invention provides a method of generating a laser scanning area light source having high efficiency, uniform brightness and non-interference by implementing uniform illumination of 2-D spatial light modulator in the laser display with a scanning method, which differs from the existing beam-expanding techniques. Its scanning characteristics are that each of scanning points can cover many pixels, and that the adjacent scanning lines overlap a relatively large part to ensure uniform luminance of the scanning plane.

Hereinafter the light beam scanning technique will be described. A thin light beam illuminates a rotating polygon mirror rotating at a high speed. Due to rotating of the rotating polygon mirror, the light beam is made a straight line, and then a vertical scanning is performed to obtain a 2-D scanning. In the present invention, the 2-D scanning in horizontal and vertical is completed only by one rotating mirror, and the Galvanometric mirror in vertical direction is omitted. The 2-D scanning by using one rotating polygon mirror is described as follows. Each plane mirror at the side of the rotating polygon mirror is inclined in a certain angle with respect to the rotating axis direction in turn. Thereby the scanning line is moved downward by one line after rotating over one plane mirror due to a predetermined angle of the next plane mirror with respect to the current plane mirror.

According to interference principle of light, when two beams of light arrives at the surface illuminated at different time, if the interval between the times at which the two beams of light arrives at the surface exceeds interference time, they do not form interference fringes on the surface illuminated. The present invention employs a scanning method to make light points scan the surface illuminated at high speed, and when the scanning speed exceeds human eyes' visual persistence and is longer than interference time, human eyes will see a constant bright surface which is formed by many points. And each bright point appears at different time so that the coherence between each bright point is removed, thereby no interference fringe appears on the surface illuminated. In addition, distribution of light intensity in the cross section of single scanning light beam is usually non-uniform and follows certain regular distribution, such as Gauss distribution. Overlapping computation of light intensity can be implemented in different overlapping degree based on light intensity distribution of the scanning light beam. When the overlapping result of light intensity is a constant value, for example, the fluctuation value of light intensity is smaller than 1%, it can be determined that overlapping degree at this time can be used as the overlapping degree of the scanning line so as to obtain a surface illuminated having uniform luminance. This method renders laser beam directly scan the surface illuminated, makes the loss of laser energy almost minimized, so that its energy efficiency is much higher than existing beam-expanding devices.

Hereinafter, a laser projection television of the invention will be described with reference to FIG. 8 showing structures of the laser projection television using a scanning area light source of the invention.

As shown in FIG. 8, the laser projection television of the invention comprises an area laser source unit, an image combination subsystem and an imaging system.

The area laser source unit comprises a red light laser 1-R, a green light laser is 1-G, a blue light laser 1-B, a rotating polygon mirror 2 with a central rotation axis AX2 (hereinafter referred as rotation axis AX2), plane mirrors S at the side of the rotating polygon mirror 2 and mirrors 13-R and 13-B.

The image combination subsystem comprises a red channel 2-D spatial light modulator 8-R, a green channel 2-D spatial light modulator 8-G, a blue channel 2-D spatial light modulator 8-B and a combination prism 14.

The imaging system comprises a projection objective 9 and a projection screen 10.

The rotating polygon mirror 2 in the area laser source unit rotates around its own rotating axis AX2, and each plane mirror at the side of the rotating polygon mirror 2 with respect to the direction of rotating axis AX2 makes an predetermined slope angle. The slope angles of the plane mirrors S corresponding to two ends of the diameters of the rotating polygon mirror 2 are distributed uniformly in equal difference. In other words, a slope angle made by the surface of the first plane mirror S at the side of the rotating polygon mirror 2 with respect to the direction of the rotating axis AX2 equals to zero. The diameter of the rotating polygon mirror 2 through axis center of the rotating axis AX2 is perpendicular to the plane mirror S and pass through the center of the plane mirror. Thus, the diameter of the rotating polygon mirror 2 are divided into the left and right parts which are symmetric each other about the diameter of the rotating polygon mirror 2. And the plane mirrors S at the left and right sides of the rotating polygon mirror 2 are symmetric about the diameter. The plane mirrors of the rotating polygon mirror 2 are arranged in equal angle difference of the slope angles of the adjacent plane mirrors with respect to the direction of the rotating axis AX2. The number of the plane mirrors at the side of the rotating polygon mirror is even. N plane mirrors S are assumed and arranged clockwise from the first surface and then the slope angle of the first surface equals to zero. The slope angles of adjacent surfaces of two plane mirrors S from the second surface to the $(N/2)^{th}$ surface increase the same angle value progressively in turn.

The slope angles of adjacent two surface of two plane mirrors from the $(N/2+1)^{th}$ surface to the $(N-1)^{th}$ surface decrease the same angle value progressively in turn.

The red light laser 1-R, the green light laser 1-G and the blue light laser 1-B used as a trichromatic source of color television and the rotating polygon mirror 2, which rotates around its own rotation axis AX2 and the plane mirrors S thereon reflect laser, form a scanning area laser source. Mirrors 13-R and 13-B are used to change directions of beams reflected from plane mirrors S in the path of the area laser source.

The rotating polygon mirror 2 is arranged properly in the path constituted of the green channel spatial light modulator 8-G, the combination prism 14 and projection objective 9, and can rotate about its own rotation axis AX2. Three beams emitted from the red light laser 1-R, the green light laser 1-G and the blue light laser 1-B irradiates onto the same plane mirror S of the rotating polygon mirror 2. The three-color beams irradiated onto the same surface of the plane mirror are reflected back from the surface. The mirror 13-R is arranged in the path of red light beam from the red light laser 1-R. The optical axis of beam reflected from the mirror 13-R points to the center of the red channel 2-D spatial light modulator 8-R. The aperture area of beam reflected from the mirror 13-R occupies the operating area of the red channel 2-D spatial light modulator 8-R. The mirror 13-B is arranged in reflecting blue light path of the blue light laser 1-B. The optical axis of the beam of the blue channel 2-D spatial light modulator 8-B and the aperture area of beam reflected from the mirror 13-B occupies the operating area of the blue channel 2-D spatial light modulator 8-B. A green beam emitted directly from the plane mirror S of the rotating polygon mirror 2 to the green channel 2-D spatial light modulator 8-G and aperture area of the green beam reflected from the plane mirror occupies operating area of the green channel 2-D spatial light modulator 8-G.

In the image combination unit, three operating areas of the red channel 2-D spatial light modulator 8-R, the green channel 2-D spatial light modulator 8-G and the blue 2-D channel spatial light modulator 8-B are parallel to the operating areas of the combination prism 14.

In the imaging subsystem, the projection screen 10 is arranged on the image plane of the projection objective 9. The object plane of the projection objective coincides with exiting beam combined by the combination prism 14.

The principle of the area laser source is described as follows. Three-color beams of red, green and blue irradiate simultaneously to the plane mirrors of the rotating polygon mirror. Each beam of the red, green and blue beams scans a line. Two plane mirrors are symmetric about the diameter of the rotating polygon mirror and make equal slope angles with respect to the rotating axis. The slope angles of each plane mirror at the side of the rotating polygon mirror are not equal. The adjacent plane mirrors make slope angles with respect to the direction of the rotation axis of the rotating polygon mirror in equal angle difference to move scanning line up and down so as to implement a 2-D scanning and to achieve an area laser source. Since two coherent beams are irradiated onto surface illuminated at difference time, time difference of two beams irradiating to the surface illuminated early or late is longer than coherent time. Thus, based on interference principle, interference fringes can not be produced on the surface illuminated uniformly so the area laser source is a desirable trichromatic laser source.

The red, green and blue laser line beams through the rotating polygon mirror making 2-D scanning achieve an area laser source. The three beams of red, green and blue incidence to operating areas of the three 2-D spatial light modulators in three channels respectively. The three beams are modulated respectively through three 2-D spatial light modulators in three-color channels to obtain three monochromatic images of red, green and blue, which are combined into color image by combination prism. The color image combined is projected by the projection objective to the projection screen to produce color television image.

The scanning area laser source of the invention is a desirable laser source without interference, with uniform distribution brightness and high efficiency. The area laser source is used to make television structure simply, wide color gamut in video display, high color saturation and high clearness image.

The invention is implemented based on system structures shown in FIG. 8. The red light laser 1-R, the green light laser 1-G and the blue light laser 1-B are DPL solid state lasers and their wavelengths are 671 nm, 532 nm and 473 nm respectively. The material of the rotating polygon mirror 2 is made of aluminum and its diameter is 60 mm, and has 60 side plane mirrors S. Adjacent plane mirrors make two slope angles with respect to the direction of self-rotating axis AX2. The difference between two slope angles is 8', namely, $8\pi/10800$ rad. Substrates of the mirrors 13-R and 13-B are made of glass and coated with aluminum. The aperture of the beams reflected occupies the 2-D spatial light modulators respectively. And area array liquid crystal valves having a size of 0.9 inch are used as red, green and blue 2-D spatial light modulators respectively. The projection objective 46 uses a zoom lens having a focal length of f=18~21 mm.

The present invention provides an area light source by laser beam scanning to implement the illumination of a 2-D spatial light modulators (LCD, LCOS and DMD, etc.), which is different from the area light source obtained by the conventional beam expanding method. As a result, the area light source of the invention removes the interference noises in image and has high efficiency. Though the invention are described by taking single rotating mirror as an example, the scanning could be carried out by various modes, such as a horizontal rotating mirror plus a vertical rotating mirror, and an electric light scanning. Similarly, other light emitter could be adopted in the invention in addition to the laser described.

The main idea of the invention is to implement laser display by combining a scanning area light source and a 2-D spatial light modulator, and the generation of the scanning area light source does not need to synchronization signal of the image. The following area light sources could be used in the invention:

1. a scanning area light source implemented by single rotating mirror having multiple surfaces and variable slopes, for example, the embodiment above described;
2. a scanning area light source implemented by a horizontal rotating mirror plus a vertical rotating mirror;
3. an area light source implemented by various electric light scanning methods.

As broadly described, any one of methods of implementing laser display by combining a scanning area light source and a 2-D spatial light modulator will fall into the protection scope of the invention.

It is apparent that the present invention is not limited to the above embodiments but may be changed and modified without departing from the scope and the spirit of the invention.

What is claimed is:

1. A light projection television using a scanning area light source, comprising an area light source unit, an image combination unit and an image unit, wherein the area light source unit is used for projecting three monochromatic light beams of R, G and B onto a rotating polygon mirror rotating at high speed, the rotating polygon mirror is a polygon central symmetrical about an axis which is perpendicular to the rotating polygon mirror and passes through the center of the rotating polygon mirror, each plane mirror at the side of the rotating polygon mirror is a reflective mirror, and the reflective mirrors make a slope angle to each other along the axial direction; N reflective mirrors are arranged on the rotating polygon mirror, and for the 1st to (N/2)th reflective mirrors, the angle thereof with respect to the axial direction increments an angle value progressively in turn; for the (N/2+1)th to Nth reflective mirrors, the angle thereof with respect to the axial direction decrements the same angle value progressively in turn, so that the rotating polygon mirror is plane symmetrical; when scanning, after rotating the rotating polygon mirror one round, a round-trip scan is finished, wherein N is an even number; the rotating polygon mirror is used for horizontally scanning the light beam to generate a horizontal line, vertically scanning the light beam line by line, accompanying with the rotation of the rotating polygon mirror, the monochromatic light beam emitted from the laser is transformed into a uniform area light source which is refreshed with a predetermined field frequency; in such manner, each monochromatic light, after passing through the rotating polygon mirror, is transformed into a uniform area light source without interference; the area (plane) light sources finally irradiate onto three spatial light modulators of R, G and B;

the image combination unit is used for combining three monochromatic images into a color image, wherein three spatial light modulators illuminated by three monochromatic light beams of R, G and B form three channel monochromatic images, which are combined in a combination prism to generate a color image;

the imaging unit is used for projecting the color image from the combination prism on a screen via an objective lens by taking the color image as an object of the objective lens.

2. The light projection television as claimed in claim 1, wherein said area light source unit comprises a red light emitter, a green light emitter, a blue light emitter, a rotating polygon mirror, a central rotation axis of the rotating polygon mirror, plane mirrors S at the side of the rotating polygon mirror and mirrors.

3. The light projection television as claimed in claim 1, wherein said image combination unit comprises a red channel 2-D spatial light modulator, a green channel 2-D spatial light modulator, a blue channel 2-D spatial light modulator and a combination prism.

4. The light projection television as claimed in claim 1, wherein said imaging unit comprises a projection objective and a screen.

5. The light projection television as claimed in claim 2, wherein said rotating polygon mirror is arranged properly in the path constituted of the green channel spatial light modulator, the combination prism and the projection objective, and can rotate about its own rotation axis, three light beams emitted from the red light emitter, the green light emitter and the blue light emitter irradiate onto the same plane mirror (S) of the rotating polygon mirror, and then reflected back from the surface, the mirror is arranged in the path of red light beam from the red light emitter, the optical axis of beam reflected from the mirror points to the center of the red channel 2-D spatial light modulator, the aperture area of beam reflected from the mirror occupies the operating area of the red channel 2-D spatial light modulator, the mirror is arranged in reflecting blue light path of the blue light emitter, the optical axis of the beam of the blue channel 2-D spatial light modulator and the aperture area of beam reflected from the plane mirror occupies the operating area of the blue channel 2-D spatial light modulator, a green beam emitted directly from the plane mirror (S) of the rotating polygon mirror to the green channel 2-D spatial light modulator and aperture area of the green beam reflected from the plane mirror occupies operating area of the green channel 2-D spatial light modulator, three operating areas of the red channel 2-D spatial light modulator, the green channel 2-D spatial light modulator and the blue channel 2-D spatial light modulator are parallel to the corresponding operating areas of the combination prism.

6. The light projection television as claimed in claim 4, wherein said screen is arranged on the image plane of the projection objective, the object plane of the projection objective coincides with exiting beam combined by the combination prism.

7. The light projection television as claimed in claim 5, wherein each plane mirror (S) at the side of the rotating polygon mirror with respect to the direction of rotating axis makes a slope angle, the slope angles of the plane mirrors (S) corresponding to two ends of the diameters of the rotating polygon mirror are distributed uniformly in equal difference, the slope angle made by the surface of the first plane mirror (S) at the side of the rotating polygon mirror with respect to the direction of the rotating axis equals to zero, the diameter of the rotating polygon mirror through axis center of the rotating axis is perpendicular to the plane mirror (S) and pass through the center of the plane mirror, the diameter of the rotating polygon mirror are divided into the left and right parts which are symmetric each other about the diameter of the rotating polygon mirror, and the plane mirrors (S) at the left and right sides of the rotating polygon mirror are symmetric about the diameter, the plane mirrors of the rotating polygon mirror are arranged in equal angle difference of the slope angles of the adjacent plane mirrors with respect to the direction of the rotating axis, the number of the plane mirrors at the side of the rotating polygon mirror is even, N plane mirrors (S) are assumed and arranged clockwise from the first surface and then the slope angle of the first surface equals to zero, the slope angles of adjacent surfaces of two plane mirrors (S) from the second surface to the $(N/2)^{th}$ surface increase the same angle value progressively in turn, the slope angles of adjacent two surface of two plane mirrors from the $(N/2+1)^{th}$ surface to the $(N-1)^{th}$ surface decrease the same angle value progressively in turn, where $20 \leq N \leq 60$.

8. The light projection television as claimed in claim 1, wherein the scanning area light source, comprising of a light emitter and a rotating polygon mirror, and wherein, said light emitter is used for emitting a light beam and projecting it onto said rotating polygon;

said rotating polygon mirror is used for horizontally scanning the light beam to generate a horizontal line, vertically scanning the light beam line by line, and repeating above 2-D scanning to form an uniform scanning area having no interference.

9. The light projection television as claimed in claim 8, wherein a reflection surface of each plane mirror (S) at the side of the rotating polygon mirror has a slope angle with respect to the direction of selfrotating axis (AX2), a beam reflected from each plane mirror scans a line, and when rotating over one plane next plane mirror scans another line which is moved downward by one line to implement a 2-D scanning area.

10. The scanning area light source as claimed in claim 9, wherein said rotating polygon mirror rotating at high speed is a symmetric polygon about the center of axis (AX2), each plane mirror (S) reflects light beams irradiated, reflection surfaces of the adjacent plane mirrors (S) have a slope angle with respect to axial direction each other.

11. The scanning area light source as claimed in claim 10, wherein the rotating polygon mirror has N (N is a positive even number) plane mirrors (S) at the side of it and these plane mirrors (S) are symmetric about the center of the rotating polygon mirror, during scanning, in the 1–(N/2)th plane mirrors (S), the surface of each plane mirror (S) increase a same angle one by one with respect to the direction of the axis (AX2), from the (N/2+1)th plane mirror in the (N/2+1)–N/2 plane mirrors (S), each plane mirror (S) decreases the same angle one by one, the plane mirrors are arranged in symmetric on the left and right, during 1–N/2 plane mirrors (S) of the rotating polygon mirror scanning, each plane mirror (S) rotates over its surface, the scanning line moves an angle, and the scanning line moves downward by a line corresponding to the angle, when rotating over the (N/2)th surface, the scanning line moves downward by N/2 lines in total, from the (N/2+1)th line, every time rotating over one plane mirror (S), the scanning line moves upward one line until the Nth line, the rotating polygon mirror rotates each circle to complete scanning up and down reciprocately one time, where $20 \leq N \leq 60$.

12. The scanning area light source as claimed in any one of claim 9 wherein overlapping degree of two adjacent scanning lines depends on the distance between the rotating polygon mirror and a screen, and on the size of cross section of scanning beam, and also on the size of slope angle of the surface of each plane mirror (S).

* * * * *